(12) United States Patent
Kerley et al.

(10) Patent No.: US 6,399,123 B1
(45) Date of Patent: Jun. 4, 2002

(54) OLIGOSACCHARIDE REMOVAL FROM ANIMAL FEED

(75) Inventors: Monty S. Kerley; Gary L. Allee, both of Columbia, MO (US)

(73) Assignee: University of Missouri Board of Curators

( * ) Notice: Subject to any disclaimer, the term of this patent is extended or adjusted under 35 U.S.C. 154(b) by 0 days.

(21) Appl. No.: 09/579,097

(22) Filed: May 25, 2000

(51) Int. Cl.⁷ ................................................ A23K 1/165
(52) U.S. Cl. ........................... 426/49; 426/52; 426/615; 426/623; 426/629; 426/630; 426/635; 426/807
(58) Field of Search ............................ 426/49, 52, 615, 426/623, 629, 630, 635, 807

(56) References Cited

U.S. PATENT DOCUMENTS

| | | | | |
|---|---|---|---|---|
| 3,640,723 A | * | 2/1972 | Uhlig et al. ........................ | 99/9 |
| 4,873,229 A | * | 10/1989 | Deya et al. ....................... | 514/54 |
| 5,066,218 A | * | 11/1991 | Silver ............................ | 426/20 |
| 5,085,874 A | * | 2/1992 | Jungvid .......................... | 426/41 |
| 5,314,692 A | * | 5/1994 | Haarasilta et al. ............. | 424/94.2 |
| 5,720,971 A | * | 2/1998 | Beauchemin et al. ......... | 424/438 |
| 5,874,274 A | * | 2/1999 | Jakobsen et al. .............. | 435/200 |
| 5,936,069 A | * | 8/1999 | Johnson ......................... | 530/378 |
| 5,989,600 A | * | 11/1999 | Nielsen et al. ................. | 426/52 |
| 6,174,558 B1 | * | 1/2001 | Lamptey et al. .............. | 426/635 |
| 6,221,406 B1 | * | 4/2001 | Meschonat et al. ........... | 426/63 |
| 6,245,546 B1 | * | 6/2001 | Hansen et al. ................ | 435/200 |

FOREIGN PATENT DOCUMENTS

| | | | |
|---|---|---|---|
| EP | 280226 | * | 8/1988 |
| EP | 0462993 | * | 7/1994 |
| EP | 0674843 | * | 10/1995 |
| EP | 0681787 | * | 11/1995 |
| GB | 2287867 | * | 10/1995 |
| WO | 95/22601 | * | 8/1995 |
| WO | 97/13526 | * | 4/1997 |

* cited by examiner

*Primary Examiner*—Chhaya D. Sayala
(74) *Attorney, Agent, or Firm*—Lathrop & Gage LC

(57) ABSTRACT

The present invention relates to a method for producing a treated animal feed having a comparatively higher metabolizable energy value and fewer oligosaccharides than in untreated feed, with the present method including the steps of adding an enzyme at ambient conditions to the animal feed and allowing the enzyme to hydrolyze the oligosaccharides. The present invention also relates to the resultant animal feed.

12 Claims, No Drawings

OLIGOSACCHARIDE REMOVAL FROM ANIMAL FEED

FIELD OF INVENTION

The present invention relates to a method for removing oligosaccharides from animal feed prior to consumption by an animal subject and the resultant animal feed. More particularly, the present invention relates to increasing the metabolizable energy available in the feed, which includes breaking down raffinose and stachyose.

BACKGROUND OF INVENTION

Ground soybeans, corn, wheat, and other similar products are the primary sources of food in the diet of a variety of animals, including hogs and chickens. In particular, soybeans comprise a substantial portion of the diet of these animals. The ground soybean meal contains substantial amounts of the oligosaccharides, in particular raffinose and stachyose. The presence of oligosaccharides is undesired for a number of reasons. Oligosaccharides reduce the metabolizable energy value of the feed given to animals by greater than 15 percent, so that the energy available to the animal is reduced and the animal does not as readily use available energy found in the feed. In turn, non-utilization of available energy will prevent maximum growth and weight gain by the animals who consume the feed. Resultingly, it is desired to increase the amount of energy that can be metabolized by an animal from a food source.

Further problems associated with the presence of oligosaccharides relate to sticky fecal droppings and an increase in flatulence. Oligosaccharides in feed cause the fecal droppings to be stickier than droppings of animals that have not consumed oligosaccharides as part of their diet. Increased flatulence in animals also increases as a result of oligosaccharide consumption. Such problems are exacerbated in farms and production facilities where animals are concentrated, as extremely unpleasant odors are associated therewith. Such strong odors can foul the air of areas adjacent to such facilities. More importantly, sticky droppings can be a problem because they will stick to the feet or hoofs of the animals in contact with the droppings. Adherence to the feet of the animals will cause the formation of sores on the animals. The sores can then result in the animals becoming infected, with the sores decreasing the fitness of such animals. As such, there is a strong desire to reduce the stickiness of droppings so as to promote better overall health in a flock or herd of farm animals. It is further desired to reduce the occurrence of flatulence in these animals. For the above reasons, it is desired to have a method and/or composition for removing oligosaccharides from feed.

Previously, attempts have been made to remove oligosaccharides from feed by using enzyme technology to hydrolyze and remove the oligosaccharides. These attempts have failed in part because the methods for promoting hydrolysis typically included heating the enzyme and feed mixture. Heat is often necessary to promote hydrolysis; while the heat results in the hydrolyzation of the oligosaccharides it also causes a maillard reaction. This reaction causes sugars in the feed to caramelize and prevents complex sugars from being readily metabolized by the animals that are fed the treated feed. The resulting maillard reaction reduces the amount of energy available to the animal.

Other methods for removing oligosaccharides have included adding an enzyme to the feed prior to consumption by an animal, but not inducing immediate hydrolyzation. The enzyme hydrolyzes the oligosaccharides in the gut of the animal. This process has failed because it can be impractical and does not sufficiently break down or hydrolyze the oligosaccharides. In particular, there is a risk the enzyme will degrade as a result of storage prior to hydrolyzing the oligosaccharide. Also, when the enzyme and feed are in the gut of the animal, it is possible the enzyme will be digested prior to the enzyme hydrolyzing the oligosaccharides.

Thus, it is desired to have a method and/or composition that hydrolyzes oligosaccharides and, in turn, eliminates sticky droppings and reduces the occurrence of flatulence. It is also desired to have a method and/or composition that substantially eliminates oligosaccharides and increases the amount of available energy to the animal that consumes the treated feed. In order to increase the amount of available energy that can be metabolized by the animal, it is further necessary to have a method that does not result in a maillard or similar type of reaction. Finally, it is desired to have a method that efficiently and consistently hydrolyzes the oligosaccharides.

SUMMARY OF INVENTION

The present invention relates to a method for removing, or hydrolyzing to monosaccharides, oligosaccharides found in animal feed and the resultant treated animal feed. In particular, the present invention relates to adding an amount of enzyme to an amount of feed prior to consumption by an animal, whereby the enzyme degrades or hydrolyzes the oligosaccharides found in the feed to form an animal feed having fewer oligosaccharides. Such animal feed will have a higher metabolizable energy level and will decrease the rate of sticky droppings and flatulence in animals that consume such feed on a regular basis. Importantly, an animal that consumes such feed will be able to derive a greater amount of energy from the treated feed as compared to an equal amount of untreated feed. Increased energy absorption results in potentially enhanced weight and feed efficiency gain and health in such animals.

The method is initiated by obtaining an amount of feed and, preferably, treating such feed to reduce the particle size. It is desired for the feed to have a particle size smaller than the particle size of the feed in an untreated or seed state. Decreasing the particle size will allow for greater enzymatic activity because of an increased availability of surface area.

An amount of enzyme will be mixed with the feed to cause hydrolysis of the oligosaccharides. Use of an enzyme is preferred; however, any protein that catalyzes a reaction, whereby oligosaccharides are hydrolyzed to monosaccharides, may be used as long as it does not adversely affect the animal's health and function under ambient conditions or conditions close to ambient. Any enzyme can be selected as long as it degrades the oligosaccharides to monosaccharides, functions at temperatures less than those which cause a maillard reaction, and the resultant feed has a metabolizable energy value of greater than 20% as compared to untreated feeds. Preferably, the enzyme is selected from the group consisting of xylanase, galactosidase, cellulase, and combinations thereof. Any amount of enzyme can be added as long as the available oligosaccharides are sufficiently degraded. In chickens fed soybean meal, this means approximately 45% or more of the available oligosaccharides are degraded. It is also preferred to add water to the enzyme and feed mixture so as to enhance enzyme distribution and contact between the enzyme and the oligosaccharides. Any method for enhancing enzyme distribution, however, can be used.

The resultant feed should have fewer oligosaccharides than untreated feed. Additionally, the feed should have a metabolizable energy value of greater than 20% as compared to untreated feed. The feed will not contain reaction products resulting from a maillard reaction and will be formed prior to consumption by an animal.

The present invention overcomes a number of problems associated with previously disclosed treated and untreated animal feeds. A resultant feed is produced that has a higher metabolizable energy value, that reduces the rate of flatulence and sticky droppings in animals that consume such feed, and that has fewer oligosaccharides present than untreated feeds. Additionally, the present feed can be stored for a period of time. The method is advantageous because not only are the oligosaccharides reduced to monosaccharides, but the method consistently reduces the oligosaccharides so that a consistent result or feed is achieved.

DETAILED DESCRIPTION

The present invention relates to a method for eliminating oligosaccharides from animal feed and the resulting animal feed. The method includes the steps of mixing a sufficient amount of an enzyme with an amount of feed, with the enzyme hydrolyzing the oligosaccharides found in the feed. The resulting feed will be substantially free of oligosaccharides and will have a higher true metabolizable energy value than feeds which contain greater amounts of oligosaccharides or have maillard reaction products. Stated another way, the animal will absorb more energy from the present treated feed than an untreated feed. The preferred enzyme for use is a galactosidase, which specifically hydrolyzes the oligosaccharides, raffinose and stachyose.

The method is initiated by obtaining an amount of feed which can be selected from the group consisting of soybeans, corn, wheat, sorghum, and any of a variety of other types of feeds which contain oligosaccharides and which are typically consumed by livestock and farm animals. It is most preferred to apply the present method to ground soybean material because soybeans tend to contain significant levels of oligosaccharides and comprise a significant portion of most farm animals' diets. Soybeans are fed to such animals because it is desired for them to be fed increased amounts of protein. The feed is preferably ground so that a greater feed surface area is exposed to the enzymes that are mixed with the feed. Typically, the grind size is that which is desired for feeding chickens and/or hogs. As a general guide, finer grinds are preferred. At the very least, it is preferred to crack the seed in half to increase the feed surface area exposed to the enzyme.

Once the feed material is obtained in a sufficient quantity and has a desired particle size, it is placed in a device where the feed and enzyme can be mixed, preferably a mixing tank or similar structure. The amount of feed added to the mixing tank, or similar device, is dependent upon the size of the device. Essentially, any amount of feed can be treated.

Added to the feed in the mixing tank will be an amount of enzyme or protein capable of hydrolyzing oligosaccharides under ambient conditions or conditions whereby the mixture is heated to a temperature below that where a maillard reaction occurs. Any of a variety of enzymes can be used as long as the oligosaccharides, specifically raffinose and stachyose, are broken down to monosaccharides, such as fructose, galactose, glucose, and combinations thereof. The enzyme added must cause the degradation of the oligosaccharides to the monosaccharide constituents, which are more easily metabolized. The oligosaccharides should be hydrolyzed by the enzyme under ambient or near ambient conditions. Further, the enzyme selected must have sufficient enzymatic activity to reduce the amount of oligosaccharides and, resultingly reduce the amount of sticky droppings. Ultimately, the enzyme should sufficiently degrade the oligosaccharides in an amount sufficient to increase the total metabolizable energy available in the feed.

The enzyme should remain in contact with the feed for a period of time sufficient to result in hydrolysis of the oligosaccharides. Generally, this is equal to approximately one (1) hour. Lesser times may be used, dependent upon the enzymatic activity.

While a variety of enzymes can be selected for use in the present method, preferred enzymes include galactosidase, xylanase, cellulase, and combinations thereof. The most preferred enzyme for use is galactosidase, especially α-galactosidase. The enzyme should be added in an amount equal to between about 0.1% and 1% by weight of the feed. Greater amounts could be added, but it is hypothesized that an increase in enzyme activity, more particularly the number of oligosaccharide molecules hydrolyzed, would not occur, as this is a sufficient amount of enzyme to hydrolyze the majority of the available oligosaccharide molecules. In order to achieve a sufficient increase in TME, at least 45% of the available oligosaccharides (stachyose and raffinose) must be removed from soybeans. Similar amounts in other feeds should be removed when such amounts are adjusted in view of the amount of oligosaccharides present in soybeans. Stated another way, the metabolizable energy available to an animal should increase by at least 20%. While it is preferred that greater percentages of the oligosaccharides be hydrolyzed, it is believed that this is a sufficient amount to prevent sticky droppings and to raise the total metabolizable energy available in the feed to levels sufficient to result in increased growth and weight gain by subjects that consume such feed.

While the enzyme can be added to the feed in a dry mix form, it is more preferred to add an amount of water to the feed and enzyme mixture. The addition of water will allow the enzyme to more readily disperse and contact the surface of the feed. Consequently, increased contact results in more accessibility of the enzyme to the oligosaccharides. When a dry mix is used, it has been observed that the percentage of oligosaccharides reduced for a particular amount of enzyme is decreased because presumably there is less contact between the enzyme and the oligosaccharides. As such, the water should be added in an amount sufficient to allow for ready dispersion of the enzyme in the feed mixture. It is most preferred if the water is added to the feed in the mixing tank in an amount sufficient to cover the feed. The mist is most preferably sprayed on the feed to cause greatest coverage.

Once the enzyme is added to the feed material, with or without water, the enzyme should remain in contact with the feed for at least one hour so as to ensure sufficient oligosaccharide degradation. Any amount of time, however, may be used, as long as sufficient degradation of the oligosaccharides occurs. After the break down of the oligosaccharides, it may be necessary to separate the water from the feed. The water should be removed if the feed is going to be stored. Water removal can be accomplished by first draining away the excess water, followed by drying the feed. The drying step can involve any of a variety of methods designed to lower the water activity level of the feed to 0.7 or less. Water activities can vary as long as the amount of water available readily inhibits the likelihood of bacterial propagation. The suitable devices and/or methods can vary as long as a maillard reaction does not occur and the total metabolizable energy level of the treated feed is not lowered. Among the suitable devices are air dryers and low heat dryers. It is desired to remove the moisture to lower the weight of the feed and to prevent spoilage.

The treated feed can then be fed to any of a variety of animals, including cows, pigs, chickens, turkeys, goats, fish, and any of a variety of other animals used in food production. It is preferred to feed the treated animal feed to turkeys or chickens because of the prevalence of sticky droppings in such animals, especially those that are raised in large production facilities where significant numbers of animals are kept in close proximity. The animals should be fed the feed daily until such time as the animals are ready to be slaughtered for human consumption.

It is preferred to produce the feed in a production facility so that when the farmer or rancher receives the feed, it is ready to be fed to the animals without any steps or effort required by the farmer or rancher. It is not necessary, however, to prepare the feed in a production facility prior to sale to the farmer. Instead, the feed can be placed in a trough or bin by the farmer, followed by adding water and a packet of the enzyme. The constituents are then mixed and allowed to stand for about one hour. Alternatively, the feed can include the enzyme with the farmer only required to add water. Once sufficient time has passed to allow for a breakdown of the oligosaccharides, the feed can then be made available to the livestock or animals for consumption. Importantly, the feed must be treated prior to consumption by the animal.

The following examples are for illustrative purposes only and are not meant to limit the claims in any way.

EXAMPLES

Example 1

In four (4) pens, five (5) chickens were placed in each pen so that a total of 20 chickens were tested. The chickens were fed a diet of ground soybean meal with each chicken fed an average of 30 grams (gms) of feed. The gross energy (GE) for the feed was measured prior to consumption by the chickens. Total metabolizable energy (TME) is the amount of energy an animal can derive from a food source for metabolic functions. The ceca of each chicken was removed prior to conducting the present studies; this was done to ensure that energy was not lost as a result of methane formation by intestinal microflora. After feeding, the urine and feces excreted by the chickens were collected and the gross energy found in the waste products was calculated. The GE was reported as kilocalories/gram (kcals/gm). This was done for the feed prior to consumption and for the waste material. The TME was calculated as the GE of the feed consumed minus the GE of the feces and urine. This value was then corrected for the energy associated with nitrogen metabolites in the excreta to derive the TME value using the equation (intake kcal−(waste kcal+(8.73×(intake gms nitrogen−(waste gms nitrogen−endogenous gms nitrogen))))+endogenous kcal)/feed intake. The data was totaled and averaged and, is expressed below in the tables.

TME

| FEED ENERGY | |
|---|---|
| Grams Fed | 30 |
| Gross Energy (GE) of the Feed (kcal/gm | 4.46320 |
| GE Fed (kcal) = | 133.896 |
| GE Fed relates to the average GE for the feed prior to consumption | |
| FASTED EXCRETED ENERGY (ENDOGENOUS) | |
| Grams Waste | 5.25 |
| GE Waste (kcal/gm) | 3.00508 |
| Grams Waste × GE = | 15.77667 |
| Waste is equal to total gms of urine and feces GE waste relates to the average GE for the endogenous waste. The endogenous energy was subtracted from the excreted energy. | |

| FED EXCRETED ENERGY | | | | |
|---|---|---|---|---|
| PEN # | 1 | 2 | 3 | 4 |
| Grams Waste | 17.4 | 17.4 | 17.3 | 17.8 |
| GE Waste (kcal/gm) | 3.49953 60.89176 | 3.39158 5.9013e+4 | 3.48530 60.295e+4 | 3.45619 61.520e+4 |
| TME (kcal/gm) | 2959 | 3022 | 2979 | 2938 |

Grams waste equals total waste excreted by all five chickens in the pen.

The energy values were also calculated, but nitrogen was removed from the calculation. This is because nitrogen holds more energy than the other constituents, and by eliminating nitrogen from the calculation, a more accurate measure of the TME can be determined across samples. The calculations less nitrogen are as follows:

TMEn (This is TME Less Nitrogen)

| FEED | |
|---|---|
| N % | 8.199 |
| GE (kcal/gm) | 4.4632 |
| kcal input: | 133.896 |
| g N input | 2.4597 |
| FASTED EXCRETED (ENDOGENOUS) | |
| N % | 21.278 |
| GE (kcal) | 3.00508 |
| kcal endogenous energy | 15.77667 |
| g endogenous nitrogen in waste | 1.117095 |

| | FED EXCRETED | | | |
|---|---|---|---|---|
| PEN # | 1 | 2 | 3 | 4 |
| N % (avg) | 16.653 | 14.757 | 14.987 | 14.365 |
| GE (kcal) | 60.89176 | 5.9013e+1 | 6.0295e+1 | 6.1520e+1 |
| g N excreted fed | 2.897622 | 2.567718 | 2.592751 | 2.55697 |
| TMEn (kcal/kg) | 2762 | 2728 | 2693 | 2642 |

As can be seen, both TME and TMEn had fairly consistent measurements. The TME averaged 2775 kcal/kg and the TMEn averaged 2706 kcal/kg.

Example 2

The same protocol disclosed in Example 1 was followed in the present Example except that the soybean meal was treated with 4 ml of galactosidase prior to consumption by the chickens. The galactosidase and soybean meal were allowed to remain in contact for a sufficient period of time (approximately one hour) to allow breakdown of oligosaccharides found in the soybean meal. Again, the same data and calculations were made, as disclosed in Example 1.

TME

| FEED ENERGY | |
|---|---|
| Grams Fed (85% dry matter) | 34.5 |
| Gross Energy (GE) of the Feed (kcal/gm) | 4.23350 |
| GE Fed (kcal) | 146.05575 |

| FASTED EXCRETED ENERGY (ENDOGENOUS) | |
|---|---|
| Grams Waste | 5.25 |
| GE Waste (kcal/gm) | 3.00508 |
| Grams Waste × GE | 15.77667 |

| | FED EXCRETED ENERGY | | | |
|---|---|---|---|---|
| PEN # | 5 | 6 | 7 | 8 |
| Grams Waste | 18.3 | 17.4 | 18.2 | 20 |
| GE Waste (kcal/gm) | 3300.78 | 3634.99 | 3133.30 | 3364.84 |
| | 60.404 | 63.248 | 57.026 | 67.296 |
| TME (kcal/kg) | 3381 | 3286 | 3494 | 3151 |

TMEn

| FEEDSTUFF | |
|---|---|
| N % | 7.072 |
| GE (kcal/gm) | 4.2335 |
| kcal input: | 146.05575 |
| g N input | 2.43984 |
| FASTED EXCRETED ENDOGENOUS | |
| N % | 21.278 |
| GE (kcal/gm) | 3.00508 |
| kcal endogenous | 15.77667 |
| g endogenous nitrogen | 1.117095 |

| | | FED EXCRETED | | |
|---|---|---|---|---|
| PEN # | 5 | 6 | 7 | 8 |
| N % (avg) | 18.16 | 11.817 | 15.934 | 15.955 |
| GE (kcal) | 6.0404e+1 | 6.3248e+1 | 5.7026e+1 | 6.7296e+1 |
| g N excreted fed | 3.323282 | 2.056158 | 2.899988 | 3.191 |
| TMEn (kcal/kg) | 3313 | 2944 | 3190 | 3274 |

The TME averaged 3328 and the TMEn averaged 3180. As can be seen, the total metabolizable energy measured with and without nitrogen shows that the enzyme treatment increased both measurements of true metabolizable energy (20.0% and 17.5% for TME and TMEn, respectively). What this means is that more energy was absorbed from the feed by the animal subject that consumed such feed.

Example 3

The same protocol disclosed in Example 1 was followed in the present Example except that the soybean meal (30 gm) was mixed with 4 gms of galactosidase powder prior to consumption by the chickens. The galactosidase powder and soybean meal were allowed to remain in contact for the same period of time as when the enzyme was spray applied (Example 2) (approximately one (1) hour). This experiment was run to determine the importance of enzyme—substrate contact to facilitate oligosaccharide breakdown. Again, the same data and calculations were made, as disclosed in Example 1.

TME

| FEED ENERGY | |
|---|---|
| Grams Fed | 34 |
| Gross Energy (GE) of the Feed (kcal/gm) | 3.98248 |
| GE Fed (kcal) | 135.40432 |
| FASTED EXCRETED ENERGY (ENDOGENOUS) | |
| Grams Waste | 5.25 |
| GE Waste (kcal/gm) | 3.00508 |
| Grams Waste × GE | 157.7667 |

| FED EXCRETED ENERGY | | | | |
|---|---|---|---|---|
| PEN # | 13 | 14 | 15 | 16 |
| Grams Waste | 21.6 | 19.9 | 20.4 | 16.2 |
| GE Waste (kcal/gm) | 3.14167 | 3.25386 | 3.47443 | 3.06072 |
|  | 67.860 | 64.751 | 70.878 | 49.583 |
| TME (kcal/kg) | 2451 | 2542 | 2362 | 2988 |

TMEn

| FEEDSTUFF | |
|---|---|
| N % | 7.303 |
| GE (kcal/gm) | 3.98248 |
| kcal input: | 135.40432 |
| g N input | 2.48302 |
| FASTED EXCRETED | |
| N % | 21.278 |
| GE (kcal/gm) | 3.00508 |
| kcal endogenous | 15.77667 |
| g N endogenous nitrogen | 1.117095 |

| FED EXCRETED | | | | |
|---|---|---|---|---|
| PEN # | 13 | 14 | 15 | 16 |
| N % (avg) | 16.126 | 15.246 | 14.998 | 16.516 |
| GE (kcal) | 6.7860e+1 | 6.4751e+1 | 7.0878e+1 | 4.9583e+1 |
| g N excreted fed | 3.483216 | 3.033954 | 3.059592 | 2.675592 |
| TMEn (kcal/kg) | 2421 | 2397 | 2223 | 2751 |

The TME averaged 2586 and the TMEn averaged 2448. As can be seen, the total metabolizable energy measured with and without nitrogen shows that the enzyme treatment did not result in a significant increase in TME. On the contrary, the TME and TMEn were both lower than untreated feeds. This indicates that the addition of a liquid may be preferred.

Example 4

An average measurement of TMEn was made. The following table shows the average before treatment and after treatment with 4 ml of galactosidase.

| True Metabolizable Energy Values (Corrected for Nitrogen) | |
|---|---|
|  | TMEn (kcal/kg) |
| Soybean meal | 2825 |
| Soybean meal treated with Galactosidase | 3309 |

As can be seen, the TMEn, after treatment, was significantly higher.

The table below summarizes the average TME for the three (3) different types of treated feed previously disclosed in Examples 1–3.

|  | Pen | | | | |
|---|---|---|---|---|---|
| Item | 1 | 2 | 3 | 4 | Average |
| Soybean meal | 2959 | 3022 | 2979 | 2938 | 2974 |
| Liquid enzyme | 3381 | 3286 | 3494 | 3151 | 3328 |
| 4 gms Powder enzyme | 2451 | 2542 | 2362 | 2988 | 2586 |

As was discussed, the liquid enzyme treatment resulted in a feed having a higher TME than feeds that were not treated and feeds that were treated with powder enzymes. The enzyme has a lower TME value than the soybean meal tested in these experiments. This is the contributing reason why the powder enzymes had a lower TME than non-treated treated feed. Importantly, this demonstrates that the TME is significantly higher in the treated soybean meal than the untreated soybean meal.

Example 5

Three (3) sets of five pens (five chickens per pen) were weighed and the average weight for each set was determined. The three (3) sets of animals were then fed typical-industry diets with one group receiving ground soybean meal, the second group receiving soybean meal treated with a liquid enzyme, and the third group receiving soybean meal mixed with water. The 14-day weight gain for the animals was measured and averaged for each group. Also, the average daily weight gain and the average daily intake of food by each group of animals was measured and averaged.

|  | Control | Enzyme | Water |
| --- | --- | --- | --- |
| Initial weight (g) | 74.6 | 74.4 | 74.7 |
| 14 day weight (g) | 589.3 | 614.2 | 586.6 |
| Average daily gain (g) | 36.8 | 38.6 | 36.6 |
| Average intake, daily (g) | 45.9 | 47.8 | 45.8 |

The results demonstrate that chickens fed the enzyme treated feed weighed more after 14 days than the chickens of the other two test groups. The chickens receiving the enzyme treated grain also had a greater average daily weight gain and consumed more feed per day. As such, this demonstrates that enzyme treated feed will produce enhanced weight gain in subjects that consume such feed.

Example 6

The same protocol disclosed in Example 5 was followed in the present Example except that a water only treatment was not evaluated. Two sets of chickens (eight pens per set with five chickens per pen) were fed typical-industry diets with soybean meal or with soybean meal treated with liquid enzyme. The 14-day weight gain for the animals was measured and averaged for each group. Also, the average daily gain and the average daily intake of food by each group of animals was measured and averaged.

|  | Control | Enzyme |
| --- | --- | --- |
| Average daily gain (g) | 41.8 | 43.1 |
| Average intake (g) | 52.9 | 49.5 |
| Gain/feed ratio | 0.8 | 0.9 |

The results demonstrate that chickens fed the enzyme treated feed had a greater average daily weight gain and an improved gain to feed ratio. The improvement in weight gain due to enzyme treatment was similar between Example 4 and 5.

Example 7

The waste that was excreted from the chickens used in the growth assay detailed in Example 6 were analyzed for raffinose and stachyose content. The oligosaccharides (raffinose and stachyose) were measured by liquid chromatography. The milligrams of raffinose and stachyose excreted in the waste of each pen was averaged for each set of chickens.

|  | Control | Enzyme |
| --- | --- | --- |
| Raffinose (milligrams/day) | 0.4 | 0 |
| Stachyose (milligrams/day) | 1.4 | 0 |

The results demonstrate that chickens fed the enzyme treated feed did not excrete measurable quantities of raffinose or stachyose. Consequently, the enzyme was effective in removing these oligosaccharides from the soybean meal. Also, this enzyme treatment would be effective in preventing sticky droppings that are caused by the presence of raffinose and stachyose in the excreta of chickens.

Example 8

Soybean meal samples were treated with galactosidase enzyme in varying amounts as shown below. These tests were conducted to determine the desired concentration of enzyme. This level of liquid (10 mls) was adequate to facilitate enzyme to substrate contact.

|  | % Remaining | |
| --- | --- | --- |
|  | Raffinose | Stachyose |
| 0.1 ml Galactosidase + 9.9 ml $H_2O$ | 71.5% | 74.6% |
| 0.5 ml Galactosidase + 9.5 ml $H_2O$ | 42.2% | 55.0% |
| 1.0 ml Galactosidase + 9.0 ml $H_2O$ | 40.4% | 52.7% |
| 5.0 ml Galactosidase + 5 ml $H_2O$ | 41.6% | 50.0% |
| 10.1 ml Galactosidase | 58.2% | 65.5% |

The greatest disappearance of oligosaccharide was accomplished when the soybean meal was treated with 1.0 or 5.0 ml galactosidase (0.1 to 0.6% enzyme protein weight/soybean meal weight). It can be gathered from the percentage of remaining oligosaccharides, specifically raffinose and stachyose, that enzyme concentration is crucial to optimizing oligosaccharide degradation. It is concluded that greater enzyme activity occurs when the water is added. This is clearly shown when the mixtures of 1.0 and 5.0 ml of galactosidase, mixed with an amount of water, are compared to the 10.0 ml of galactosidase, mixed without any water. As can be seen, the water and galactosidase mixture had superior degradation results.

From reviewing the results, it also appears to be that there is a minimum threshold by which a sufficient amount of enzyme must be added in order to achieve sufficient degradation results. As can be seen, when only 0.5 ml of galactosidase was mixed with water, insufficient degradation occurred. However, when 1.0 or 5.0 ml of galactosidase was mixed with a similar amount of water, excellent degradation results were observed. Furthermore, it is deduced that there is a threshold for the amount of water added, whereby once that threshold is met, additional water does not result in additional degradation.

Thus, there has been shown and described a treated animal feed and a method for removing oligosaccharides from animal feed, which fulfills all of the objects and advantages sought therefor. It will be apparent to those skilled in the art, however, that many changes, variations, modifications, and other uses and applications for the subject method are possible, and also changes, variations, modifications, and other uses and applications which do not depart from the spirit and scope of the invention are deemed to be covered by the invention, which is limited only by the claims which follow.

What is claimed is:

1. A method for removing oligosaccharides from feed prior to consumption by an animal subject, whereby a feed is formed having an increased metabolizable energy value, comprising:

(a) obtaining a feed material having oligosaccharides;

(b) adding an amount of enzyme to the feed material in an amount sufficient for a sufficient time period to cause hydrolysis of the oligosaccharides and formation of a treated feed; and (c) wherein said enzyme is selected from the group consisting of galactosidase, xylanase, cellulase, and combinations thereof; and (d) wherein said enzyme is added in an amount equal to between about 0.1% and 1% by weight of the feed material.

2. The method of claim 1 wherein the feed is a ground soybean material.

3. The method of claim 1 wherein an amount of water is mixed with the feed and enzyme mixture, with the water added in an amount sufficient to cause dispersion of the enzyme.

4. The method of claim 1 wherein said treated feed has at least 45% fewer oligosaccharides and an increase in TME equal to at least 20% as compared to untreated feed material.

5. The method of claim 1 wherein the enzyme and feed are mixed together for at least one hour.

6. The method of claim 1 wherein the enzyme and the feed are mixed under ambient conditions.

7. The method of claim 1 wherein the treated feed is dried for a time period sufficient to lower the water activity to 0.7.

8. A treated animal feed according to claim 1 having prior to consumption by an animal a true metabolizable energy value having 20% more available energy and having fewer oligosaccharides than found in the feed prior to treatment.

9. The treated animal feed of claim 8 wherein the animal feed is soybean meal.

10. The treated animal feed of claim 8 wherein the TME is equal to 3300 kcal/gm.

11. The treated animal feed of claim 8 wherein the treated feed has 45% fewer oligosaccharides than untreated feed.

12. A method for increasing growth and weight gain in chickens, comprising:

(a) obtaining a feed material having oligosaccharides;

(b) adding an amount of galactosidase under ambient conditions to the feed material in an amount sufficient to cause hydrolysis of the oligosaccharides and formation of a treated feed; and, (c) feeding the treated feed to the chickens.

* * * * *